(12) United States Patent  
Harada

(10) Patent No.: US 11,358,519 B2
(45) Date of Patent: Jun. 14, 2022

(54) HEADLIGHT CONTROL SYSTEM

(71) Applicant: TOYOTA JIDOSHA KABUSHIKI KAISHA, Toyota (JP)

(72) Inventor: Tadakazu Harada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 16/110,320

(22) Filed: Aug. 23, 2018

(65) Prior Publication Data

US 2019/0126812 A1 May 2, 2019

(30) Foreign Application Priority Data

Oct. 26, 2017 (JP) .............................. JP2017-207309

(51) Int. Cl.
*B60Q 1/14* (2006.01)
*G06V 20/56* (2022.01)
*G06K 9/62* (2022.01)

(52) U.S. Cl.
CPC ........... *B60Q 1/143* (2013.01); *G06K 9/6262* (2013.01); *G06V 20/56* (2022.01);
(Continued)

(58) Field of Classification Search
CPC ................ B60Q 1/143; B60Q 2300/05; B60Q 2300/305; B60Q 2300/312;
(Continued)

(56) References Cited

U.S. PATENT DOCUMENTS

2002/0005778 A1* 1/2002 Breed ..................... G01S 7/481
340/435
2003/0086700 A1* 5/2003 Yamagami ............. H04N 5/772
386/224
(Continued)

FOREIGN PATENT DOCUMENTS

CN 105799574 A 7/2016
EP 1908631 A2 4/2008
(Continued)

OTHER PUBLICATIONS

NPL English translation of Kobayashi (JP-2011218999-A) (Year: 2011).*

(Continued)

*Primary Examiner* — James M McPherson
*Assistant Examiner* — Bakari Underwood
(74) *Attorney, Agent, or Firm* — Oliff PLC

(57) ABSTRACT

A headlight control system controls a headlight of a moving object. The moving object includes the headlight including a plurality of light emission units, and an imaging unit configured to capture images of circumstances in front. The headlight control system includes an irradiation pattern controller configured to perform control for changing at least one of presence or absence of light emission and a degree of light emission of each of the light emission units to change an irradiation pattern of the headlight to one of a plurality of irradiation patterns, an imaging controller configured to perform control such that the imaging unit captures the images of the circumstances in front for each of the irradiation patterns to acquire captured images, and a learning unit configured to learn an irradiation pattern suitable for the circumstances in front based on captured images captured for each of the irradiation patterns.

8 Claims, 5 Drawing Sheets

(52) U.S. Cl.
CPC .... *B60Q 2300/05* (2013.01); *B60Q 2300/305* (2013.01); *B60Q 2300/312* (2013.01); *B60Q 2300/314* (2013.01); *B60Q 2300/33* (2013.01)

(58) Field of Classification Search
CPC .......... B60Q 2300/314; B60Q 2300/33; G06K 9/00791; G06K 9/6262
See application file for complete search history.

(56) References Cited

U.S. PATENT DOCUMENTS

| | | | | |
|---|---|---|---|---|
| 2014/0023239 A1* | 1/2014 | Sasada | ................. | B60S 1/0844 |
| | | | | 382/104 |
| 2016/0070976 A1* | 3/2016 | Aoba | ................. | G06K 9/6262 |
| | | | | 382/180 |
| 2016/0349356 A1* | 12/2016 | Takaki | ................. | G01S 13/867 |

FOREIGN PATENT DOCUMENTS

| | | | | |
|---|---|---|---|---|
| JP | 2011218999 A * | 11/2011 | ............. | B60Q 1/085 |
| JP | 2016-107861 A | 6/2016 | | |
| WO | 2015/033764 A1 | 3/2015 | | |
| WO | WO-2018087941 A1 * | 5/2018 | ............... | B60Q 1/12 |

OTHER PUBLICATIONS

Hermann Straubinger. "LCD Headlamp With Endless Opportunities—Electronica Blog". Jul. 11, 2017.

* cited by examiner

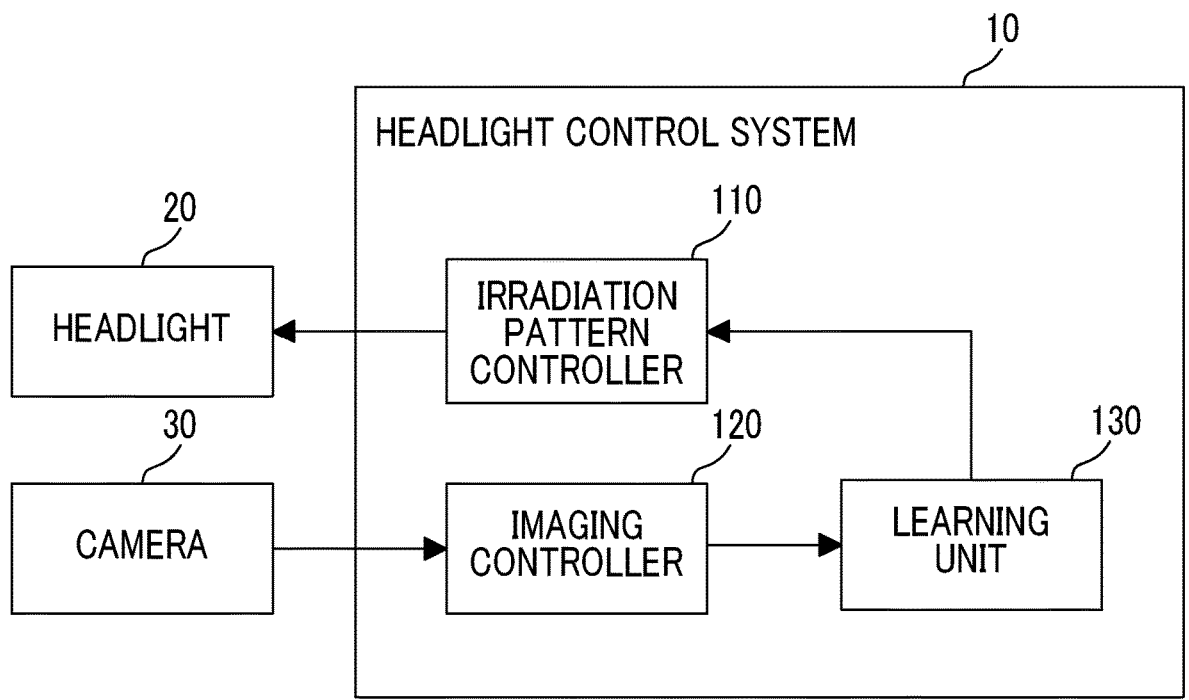

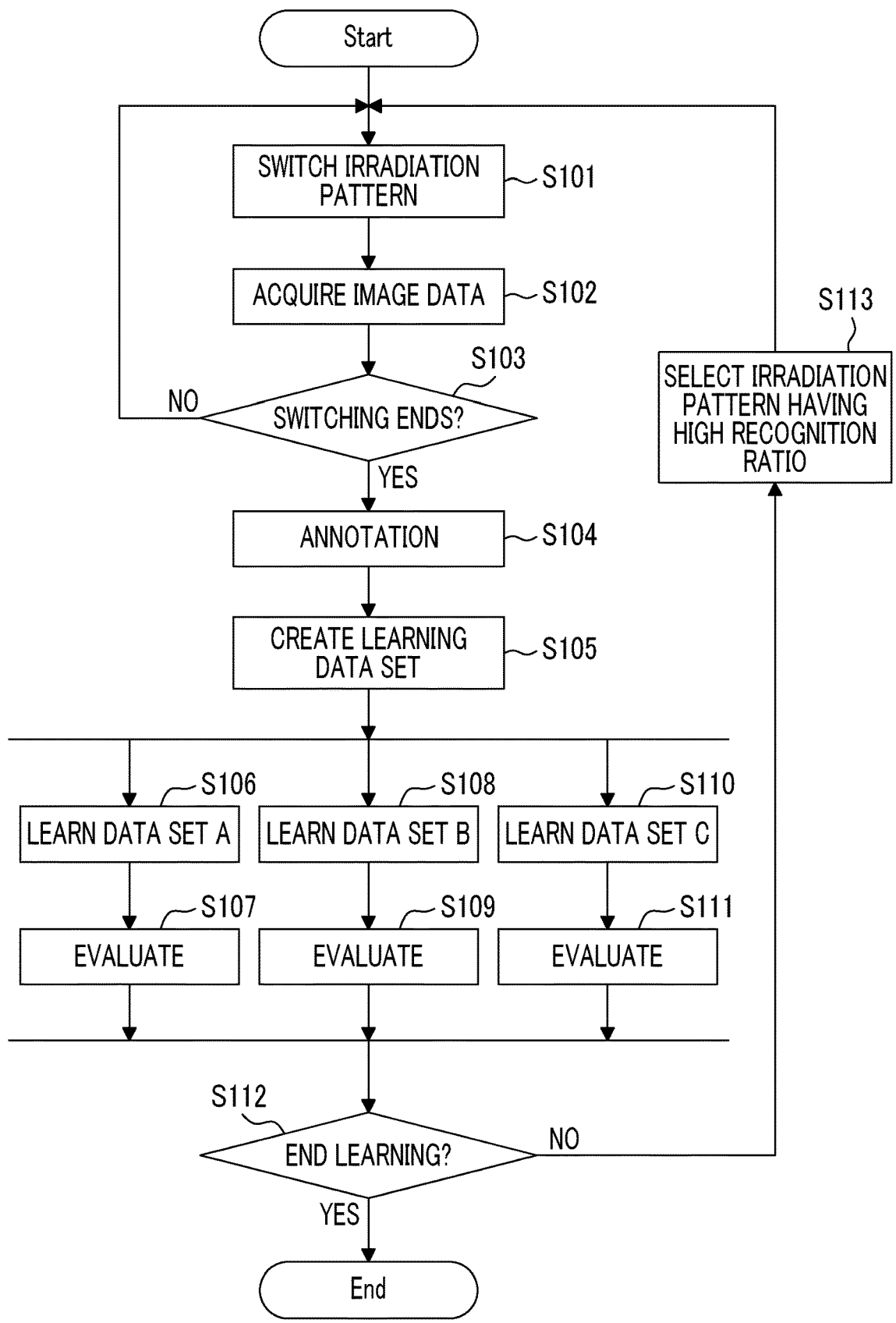

FIG. 5

FIRST LEARNING — ONE HUNDRED MILLION PATTERNS ARE SWITCHED (ONE HUNDRED MILLION IMAGES ARE ACQUIRED)

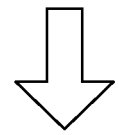

SECOND LEARNING — TEN MILLION PATTERNS ARE SWITCHED (TEN MILLION IMAGES ARE ACQUIRED)

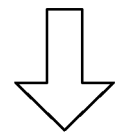

THIRD LEARNING — ONE MILLION PATTERNS ARE SWITCHED (ONE MILLION IMAGES ARE ACQUIRED)

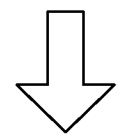

FOURTH LEARNING — ONE HUNDRED THOUSAND PATTERNS ARE SWITCHED (ONE HUNDRED THOUSAND IMAGES ARE ACQUIRED)

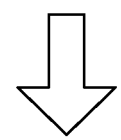

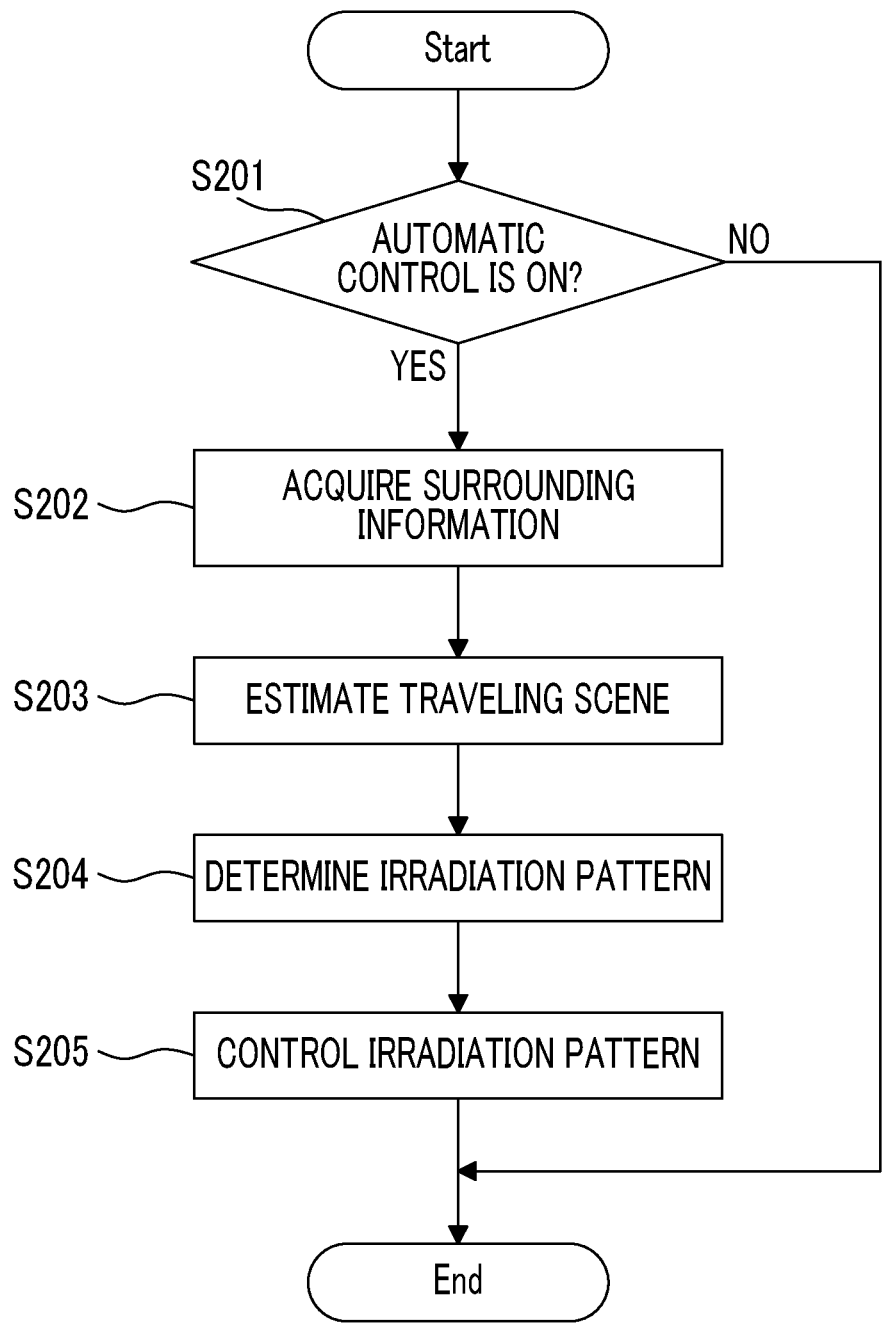

HEADLIGHT CONTROL SYSTEM

INCORPORATION BY REFERENCE

The disclosure of Japanese Patent Application No. 2017-207309 filed on Oct. 26, 2017 including the specification, drawings and abstract is incorporated herein by reference in its entirety.

BACKGROUND

1. Technical Field

The present disclosure relates to a headlight control system that controls a headlight of a moving object.

2. Description of Related Art

As a device in the related field, a device that attempts to realize a more appropriate driving environment by controlling an irradiation pattern (for example, an irradiation range, the amount of irradiation light, or the like) of a headlight mounted in a moving object, such as a vehicle, is known. For example, Japanese Unexamined Patent Application Publication No. 2016-107861 (JP 2016-107861 A) discloses a technique that controls an irradiation range of a light emitting diode (LED) headlight, thereby suppressing a glare phenomenon caused by the difference between brightness and darkness of a road surface at the time of irradiation of the headlight and improving spatial recognition characteristics of surrounding vision.

SUMMARY

An optimum irradiation pattern of the headlight is considered to be changed, for example, according to various conditions (that is, traveling scenes), such as weather, a time slot, and states of other vehicles. For this reason, it is preferable that an irradiation pattern of the headlight appropriate for each traveling scene is set. Specifically, it is desirable that an irradiation pattern suitable for a current traveling scene is set to be appropriately selected from among a plurality of irradiation patterns realizable by the headlight.

However, it is definitely not easy to set an irradiation pattern suitable for a traveling scene in advance. In addition, the number of irradiation patterns realizable by the headlight increases (that is, options of irradiation patterns increase), whereby it is more difficult to set an optimum irradiation pattern. For example, in a case where there are tens of millions or more of irradiation patterns of the headlight, a lot of time and labor is needed in order to find an optimum irradiation pattern from among the irradiation patterns.

The disclosure provides a headlight control system capable of appropriately controlling an irradiation pattern of a headlight according to a traveling scene.

A first aspect of the disclosure relates to a headlight control system that controls a headlight of a moving object. The moving object includes the headlight including a plurality of light emission units, and an imaging unit configured to capture images of circumstances in front the moving object. The headlight control system includes an irradiation pattern controller, an imaging controller, and a learning unit. The irradiation pattern controller is configured to perform control for changing at least one of presence or absence of light emission and a degree of light emission of each of the light emission units of the headlight to change an irradiation pattern of the headlight to one of a plurality of irradiation patterns. The imaging controller is configured to perform control such that the imaging unit captures the images of the circumstances in front for each of the irradiation patterns to acquire captured images. The learning unit is configured to learn an irradiation pattern suitable for the circumstances in front based on captured images captured for each of the irradiation patterns.

In the headlight control system according to the first aspect of the disclosure, the irradiation pattern controller may be configured to change the irradiation pattern of the headlight to one of the plurality of irradiation patterns during moving of the moving object. The imaging controller may be configured to perform control such that the imaging unit captures the images of the circumstances in front for each of the irradiation patterns during moving of the moving object to acquire captured images.

In the headlight control system according to the first aspect of the disclosure, the irradiation pattern controller may be configured to change the irradiation pattern of the headlight to one of the plurality of irradiation patterns in a predetermined period that is short to such an extent that the circumstances in front are considered to be not changed even though the moving object is moving. The learning unit may be configured to use captured images captured in the predetermined period for learning as captured images captured in a state in which the circumstances in front are the same.

In the headlight control system according to the first aspect of the disclosure, the learning unit may be configured to calculate a recognition ratio of an object in front of the moving object in the captured images, and learn an irradiation pattern having a higher recognition ratio, as the irradiation pattern that is more suitable for the circumstances in front.

In the headlight control system according to the first aspect of the disclosure, the irradiation pattern controller may be configured to i) select a plurality of irradiation patterns having a high possibility of being suitable for the circumstances in front based on previous learning results of the learning unit, and ii) change the irradiation pattern of the headlight to the selected irradiation patterns at a time of subsequent learning.

In the headlight control system according to the first aspect of the disclosure, the irradiation pattern controller and the imaging controller may be mounted in the moving object. The learning unit may be mounted in a device outside the moving object.

In the headlight control system according to the first aspect of the disclosure, the circumstances in front may be defined by at least one of a time slot, weather, brightness, and presence or absence of another moving object and an obstacle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a block diagram showing the configuration of a headlight control system according to an embodiment;

FIG. 2 is a conceptual diagram showing an irradiation pattern of a headlight;

FIG. 3 is a flowchart showing a flow of an operation during learning in the headlight control system according to the embodiment;

FIG. 5 is a conceptual diagram showing change in the number of irradiation patterns used during the learning operation; and FIG. 6 is a flowchart showing a flow of an operation during irradiation pattern automatic control in the headlight control system according to the embodiment.

DETAILED DESCRIPTION OF EMBODIMENTS

Figure 4A:
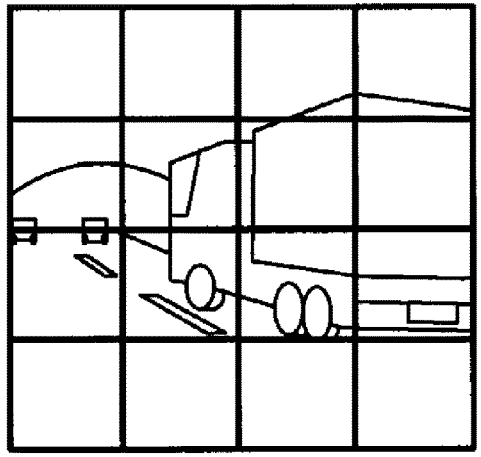
FIG. 4A is a plan view showing an example of image data acquired during a learning operation.

Hereinafter, an embodiment of a headlight control system will be described referring to the drawings. In the embodiment, a system that controls a headlight mounted in a vehicle will be described as an example.

Device Configuration

The configuration of the headlight control system according to the embodiment will be described referring to FIG. 1. FIG. 1 is a block diagram showing the configuration of the headlight control system according to the embodiment.

As shown in FIG. 1, a headlight control system 10 according to the embodiment is constituted as, for example, a part of an electronic control unit (ECU) mounted in a vehicle, and includes an irradiation pattern controller 110, an imaging controller 120, and a learning unit 130 as processing blocks realized physically or logically inside the headlight control system 10.

The irradiation pattern controller 110 can control an irradiation pattern of a headlight 20. The irradiation pattern of the headlight 20 will be specifically described referring to FIG. 2. FIG. 2 is a conceptual diagram showing the irradiation pattern of the headlight.

As shown in FIG. 2, the headlight 20 according to the embodiment is constituted of an LED matrix of vertical four and horizontal four. The LED herein is a specific example of a "light emission unit" in Supplementary Note described below. The irradiation pattern controller 110 respectively controls the lighting states of 16 parts in total of the LED matrix, thereby realizing various irradiation patterns. Specifically, each of the 16 parts of the LED matrix is switched to one of "turn-on (that is, a state of being turned on with high brightness)", "dark (that is, a state of being turned on with low brightness)", and "turn-off", thereby realizing a plurality of irradiation patterns. The headlight 20 described above is provided on each of the right and left sides of the vehicle (two in total). Accordingly, in a case where all irradiation patterns are combined, an enormous number of irradiation patterns can be realized.

The number of LED matrix included in the headlight 20 may be smaller or greater than that shown in FIG. 2. The lighting state of each of the LEDs is not limited as being switched in three stages (that is, "turn-on", "dark", and "turn-off") as described above, and for example, may be switched in two stages of "turn-on" and "turn-off" or may be configured to realize dimmer control in a larger number of stages.

Returning to FIG. 1, the imaging controller 120 acquires image data indicating circumstances in front of the vehicle from the camera 30 each time the irradiation pattern of the headlight 20 is switched by the irradiation pattern controller 110. The camera 30 is a specific example of an "imaging unit" in Supplementary Note described below, and is an in-vehicle camera that captures images of circumstances in front of the vehicle. Image data acquired by the imaging controller 120 is output to the learning unit 130. The imaging controller 120 may execute various kinds of processing (for example, filter processing and the like) on acquired image data.

The learning unit 130 learns an irradiation pattern of the headlight 20 suitable for the circumstances in front of the vehicle using a plurality of pieces of image data input from the imaging controller 120. The circumstances in front are defined, for example, according to various conditions of, for example, a time slot, weather, brightness, and the presence or absence of obstacles, such as other vehicles or pedestrians. Hereinafter, the circumstances in front may be appropriately called a "traveling scene". A specific content of learning performed by the learning unit 130 will be described below in detail.

Though not particularly limited, it is preferable that the irradiation pattern controller 110 and the imaging controller 120 in the headlight control system 10 are mounted in the vehicle; however, the function of the learning unit 130 may be provided in a server, a cloud, or the like outside the vehicle. In this case, the irradiation pattern controller 110 and the imaging controller 120 mounted in the vehicle and the learning unit 130 outside the vehicle are configured to be able to perform communication with each other.

Learning Operation

A learning operation (that is, an operation to learn an irradiation pattern according to a traveling scene) that is executed by the headlight control system 10 according to the embodiment will be described referring to FIG. 3. FIG. 3 is a flowchart showing a flow of an operation during irradiation pattern learning in the headlight control system according to the embodiment.

As shown in FIG. 3, during the learning operation, first, the irradiation pattern controller 110 performs control such that the irradiation pattern of the headlight 20 is switched (Step S101). That is, the lighting state of each of the LEDs included in the headlight 20 is controlled such that an irradiation pattern different from a previous irradiation pattern appears. Thereafter, the imaging controller 120 acquires image data in front of the vehicle illuminated with the irradiation pattern after switching (Step S102). Though not particularly limited, it is preferable that, in order to acquire image data according to various traveling scenes, the above processing is executed in a state in which the vehicle has traveled (that is, under a condition that the traveling scene changes).

The irradiation pattern controller 110 stores the number or type of irradiation patterns used in the learning operation, and in a case where determination is made that switching to all irradiation patterns ends (Step S103: YES), progresses to processing after Step S104. In a case where determination is made that switching to all irradiation patterns used in the learning operation does not end (Step S103: NO), the process is repeated from Step S101. That is, processing for switching the irradiation pattern of the headlight 20 and acquiring image data at this time is repeatedly executed. With this, image data is acquired for each of a plurality of irradiation patterns used in the learning operation.

Here, a plurality of pieces of image data acquired during the learning operation will be specifically described referring to FIGS. 4A to 4E. FIGS. 4A to 4E are conceptual diagrams showing an example of image data acquired during the learning operation.

Figure 4B:
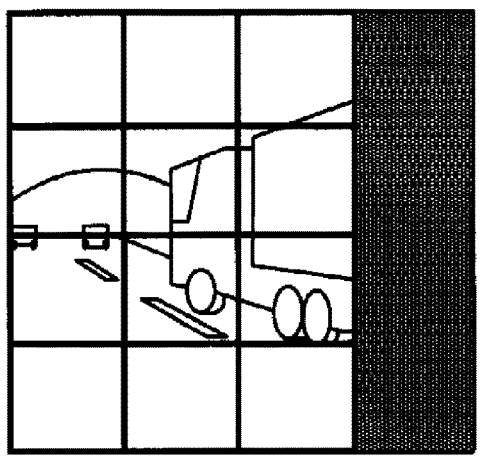
FIG. 4B is a plan view showing an example of image data acquired during the learning operation.
Figure 4C:
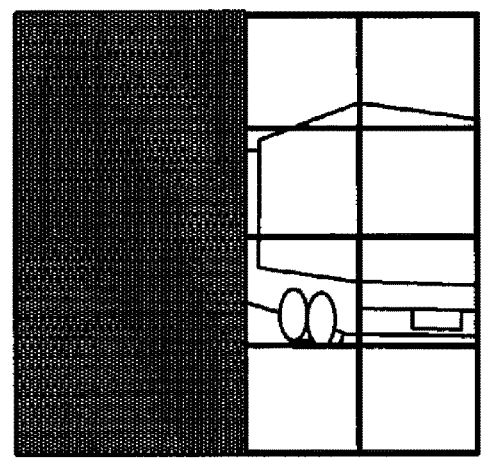
FIG. 4C is a plan view showing an example of image data acquired during the learning operation.
Figure 4D:
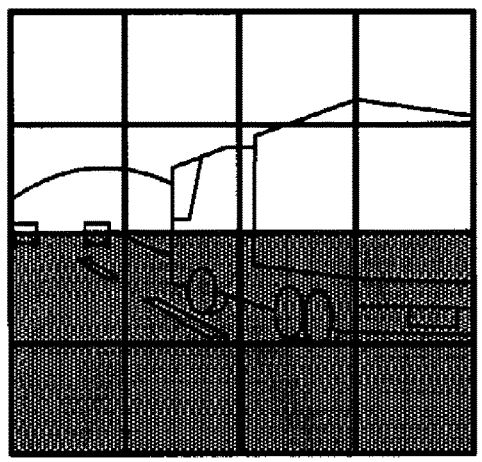
FIG. 4D is a plan view showing an example of image data acquired during the learning operation.
Figure 4E:
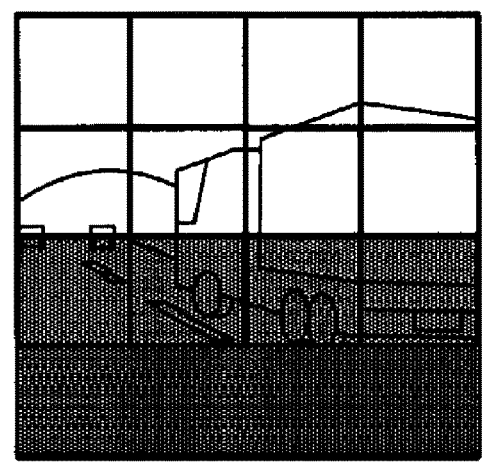
FIG. 4E is a plan view showing an example of image data acquired during the learning operation.

As shown in FIGS. 4A to 4E, the imaging controller 120 sequentially acquires images corresponding to the irradiation patterns. For example, FIG. 4A shows image data in a case where all LEDs are "turned on". FIG. 4B shows image data in a case where LEDs corresponding to a right end area are "turned off", and LEDs corresponding to other areas are "turned on". FIG. 4C shows image data in a case where LEDs corresponding to a left half area are "turned off", and LEDs corresponding to other areas are "turned on". FIG. 4D shows image data in a case where LEDs corresponding to a lower half area are "dark", and LEDs corresponding to other areas are "turned on". FIG. 4E shows image data in a case where LEDs corresponding to a lower end area are "turned off", LEDs corresponding to an area just above the lower end area are "dark", and LEDs corresponding to other areas are "turned on".

Though not particularly limited, it is preferable that image data described above is acquired as much as possible in order to perform efficient learning. Accordingly, the irradiation pattern of the headlight 20 is switched as quickly as possible at a speed according to a shutter speed of a camera. Insofar as the irradiation pattern of the headlight 20 can be switched at a high speed, even in a case where the vehicle is traveling, a plurality of images may be acquired under the substantially same condition (in other words, in a state in which the circumstances in front are not changed). In this case, it is possible to easily determine which irradiation pattern is suitable for the circumstances in front during imaging by comparing acquired image data with each other.

Returning to FIG. 3, after image data is acquired, annotation (that is, application of correct answer data) is executed for each piece of acquired image data (Step S104). Alternatively, the annotation of Step S104 may be executed in parallel with the processing of Step S102 and Step S103 (that is, the processing for switching the irradiation pattern and processing for acquiring image data). Correct answer data includes, for example, information (for example, positional information of pedestrians, bicycles, other vehicles, and other obstacles) relating to objects within an imaging range of an image. While it is easy to prepare correct answer data for learning in a simulation or the like before factory shipment, it is difficult to prepare correct answer data for learning during traveling of a vehicle after shipment. As described above, in a case where it is difficult to prepare correct answer data, learning with no correct answer data may be executed. That is, the processing of Step S104 may be appropriately omitted.

Subsequently, several learning data sets are created from a plurality of pieces of acquired image data (Step S105). Here, although three learning data sets (data set A, data set B, and data set C) are created as an example, a larger number of learning data sets may be created. The learning data sets may be simply sorted by a predetermined number of captured images or may be classified according to any rule. For example, the learning data sets may be created by executing image recognition processing for a plurality of pieces of image data and classifying image data according to traveling scenes estimated from recognition results. In this way, it is possible to suitably execute learning for each traveling scene. Since the traveling scene is considered to change over time, even in a case where each piece of image data is classified according to an acquisition time (in other words, an imaging time), it is possible to create a learning data set for each traveling scene.

After creation of learning data, the learning unit 130 executes learning processing for each data set. Specifically, learning (Step S106) and evaluation (Step S107) using the data set A, learning (Step S108) and evaluation (Step S109) using the data set B, and learning (Step S110) and evaluation (Step S111) using the data set C are executed in parallel. The learning unit 130 learns an irradiation pattern capable of improving a recognition ratio of an object (for example, a pedestrian, another vehicle, or the like) in an image using a neural network. Specifically, the learning unit 130 performs image recognition processing for image data included in each data set to calculate a recognition ratio of an object in an image. Then, a plurality of irradiation patterns is ranked in a descending order of a recognition ratio by traveling scene, and an irradiation pattern having a higher recognition ratio is learned as an irradiation pattern suitable for the traveling scene. In regard to a leaning method using the neural network, an existing technique can be appropriately employed, and thus, more detailed description will be omitted.

In a case where learning using each data set ends, determination is made whether or not all learning ends (Step S112). In regard to an end condition of learning, an appropriate condition (for example, a condition capable of determining that sufficient learning is already executed) may be set in advance. As described below, in a case where the learning operation according to the embodiment is advanced, the irradiation patterns used in learning gradually decrease. For this reason, in a case where the number of irradiation patterns used in learning is smaller than a predetermined threshold, all learning may end.

In a case where determination is made to end learning (Step S112: YES), a series of learning operation ends. In a case where determination is made not to end learning (Step S112: NO), a plurality of irradiation patterns (for example, irradiation patterns having a recognition ratio of top 10%) having a high recognition ratio is selected from among a plurality of irradiation patterns used in learning based on a past learning result (Step S113). Then, after the selected irradiation patterns are set to irradiation patterns used in a next learning operation, the process is executed from Step S101 again. That is, the same learning operation is executed again solely using the irradiation patterns determined to have a higher recognition ratio.

Here, change in the number of irradiation patterns used in the learning operation will be specifically described referring to FIG. 5. FIG. 5 is a conceptual diagram showing change in the number of irradiation patterns used during the learning operation.

As shown in FIG. 5, in the learning operation according to the embodiment, since the used irradiation patterns decrease each time the learning operation is repeated, it is possible to perform learning extremely efficiently. For example, in first learning, it is assumed that one hundred million irradiation patterns are switched and one hundred million pieces of image data are acquired. As described above, in a case where an extremely large amount of learning data is used, a more accurate learning result can be expected, while a period (including a period to acquire learning data) needed for learning is extremely extended. Accordingly, learning accuracy is high, but it is hard to say that efficient learning is performed. In contrast, in the embodiment, in second learning, ten million patterns capable of determining to have a high recognition ratio are selected from a first learning result, and the learning operation is executed using the ten million patterns. As described above, in a case where the learning operation is executed solely using the irradiation pattern having a high recognition ratio, it is possible to reduce the period needed for leaning without considerably lowering learning accuracy. Similarly, in third learning, one million patterns capable of determining to have a high recognition ratio are selected from a second learning result, and the learning operation is executed using one million patterns. In addition, in fourth learning, one hundred thousand patterns capable of determining to have a high recognition ratio are selected from a third learning result, and the learning operation is executed using one hundred thousand patterns. In a case where the learning operation is repeated as described above, it is possible to efficiently advance learning while gradually decreasing the irradiation patterns used in learning.

Automatic Control Operation

An automatic control operation of the headlight 20 using the learning result of the learning operation described above will be described referring to FIG. 6. FIG. 6 is a flowchart showing a flow of an operation during irradiation pattern automatic control in the headlight control system according to the embodiment.

As shown in FIG. 6, at the time of the operation of the headlight control system 10 where the learning operation is completed, first, determination is made whether or not automatic control of the headlight 20 is turned on (Step S201). That is, determination is made whether or not an automatic control operation of the headlight 20 is permitted. The on and off of the automatic control is set by a switch operation or the like of an occupant of the vehicle. In a case where the automatic control is off (Step S201: NO), subsequent processing is omitted, and a series of processing ends. In this case, the processing of Step S201 may be executed again after a predetermined period.

In a case where the automatic control is on (Step S201: YES), surrounding information of the vehicle is acquired (Step S202). The surrounding information is information used to estimate a traveling scene, and is acquired, for example, from the camera 30 and various other sensors (for example, a vehicle speed sensor, an acceleration sensor, a brightness sensor, a radar, a LIDAR, and the like). Thereafter, a current traveling scene is estimated based on the acquired surrounding information (Step S203). In estimating a traveling scene, an existing technique can be appropriately employed, and thus, detailed description will be omitted.

Subsequently, an irradiation pattern suitable for the estimated traveling scene is determined (Step S204). That is, an irradiation pattern optimum for the current traveling scene of the vehicle is determined based on the result of learning. Specifically, an irradiation pattern having the highest recognition ratio of an object in the current traveling scene among the irradiation patterns realizable by the headlight 20 of the vehicle is selected. Thereafter, the headlight 20 is controlled such that the determined irradiation pattern is realized. As a result, a state in which the occupant of the vehicle easily visually recognizes the circumstances in front of the vehicle or a state in which a recognition ratio of an object of the camera 30 or the like is high is realized. Accordingly, for example, the occupant can find an obstacle in front of the vehicle early and can perform deceleration or the like of the vehicle. Alternatively, the recognition ratio of the object of the camera 30 or the like is improved, whereby it is possible to execute more accurate driving assistance.

With the above, while a series of processing relating to the automatic control operation ends, the processing of Step S201 may be executed after a predetermined period from the end. In a case where the processing is executed periodically as described above, an irradiation pattern according to the current traveling scene is appropriately realized. Even during the automatic control operation, the learning operation may be appropriately executed. However, the irradiation pattern is switched at a comparatively fast speed during the learning operation. For this reason, though not particularly limited, it is preferable that switching is carried out at a frequency or timing not obstructing traveling of the vehicle.

Technical Effects

Technical effects of the headlight control system 10 according to the embodiment will be described.

With the headlight control system 10 according to the embodiment, as already described, it is possible to suitably learn the irradiation pattern of the headlight 20 according to the traveling scene. In particular, in the embodiment, since the learning operation can be performed using image data captured while switching the irradiation pattern of the headlight 20 at a high speed, it is possible to acquire, in a short period, a large amount of learning data whose collection needs time during normal, and to more efficiently advance learning. In a case where learning data is accumulated while the vehicle is traveling, it is possible to acquire learning data according to various traveling scenes.

Since the headlight 20 including a plurality of LEDs can realize an extremely enormous number of irradiation patterns by controlling the lighting state of each LED, it is not easy to find an optimum irradiation pattern according to a traveling scene from among all irradiation patterns. However, according to the embodiment, since it is possible to collect learning data used in learning at a comparatively high speed, it is possible to efficiently execute learning. In the embodiment, in particular, the learning operation is repeated while narrowing the irradiation patterns used in learning to the irradiation patterns having a high recognition ratio, whereby it is possible to more efficiently advance learning. Accordingly, even in a case where the headlight 20 can realize an enormous number of irradiation patterns, it is possible to suitably learn an optimum irradiation pattern.

In the embodiment, although the headlight that is mounted in the vehicle has been described as an example, the disclosure can also be applied to a headlight that is mounted in a moving object other than the vehicle. That is, insofar as a moving object moves while illuminating the front with a light, the headlight control system 10 according to the embodiment can be employed and the same technical effects can be obtained. The headlight control system 10 according to the embodiment can be applied to control of a light illuminating the side or the rear of the moving object.

Supplementary Notes

Various aspects of the disclosure introduced from the above-described embodiment will be described below.

Supplementary Note 1

A headlight control system according to Supplementary Note 1 is a headlight control system that controls a headlight of a moving object. The moving object includes the headlight including a plurality of light emission units, and an imaging unit configured to capture images of circumstances in front. The headlight control system includes an irradiation pattern controller, an imaging controller, and a learning unit. The irradiation pattern controller is configured to perform control for changing at least one of the presence or absence of light emission and a degree of light emission of each of the light emission units of the headlight to change an irradiation pattern of the headlight to one of a plurality of irradiation patterns. The imaging controller is configured to perform control such that the imaging unit captures the images of the circumstances in front for each of the irradiation patterns to acquire captured image. The learning unit is configured to learn an irradiation pattern suitable for the circumstances in front based on captured images captured for each of the irradiation patterns.

With the headlight control system according to Supplementary Note 1, at least one of the presence or absence of light emission and the degree of light emission (that is, solely the presence or absence of light emission, solely the degree of light emission, or both of the presence or absence of light emission and the degree of light emission) of each of the light emission units included in the headlight is changed during the operation, whereby the headlight is controlled such that a plurality of irradiation patterns appears. During control of the irradiation pattern of the headlight, the images of the circumstances in front are captured for each of the irradiation patterns. That is, a new captured image is acquired each time the irradiation pattern of the headlight is changed.

Thereafter, the irradiation pattern of the headlight suitable for the circumstances in front of the moving object is learned based on the captured image acquired for each of the irradiation patterns. For example, an irradiation pattern that allows the occupant of the moving object to easily visually recognize the circumstances in front or an irradiation pattern that allows a more appropriate recognition result to be obtained in a case where image recognition is performed using the captured images captured by the imaging unit is learned. In a case where learning described above is executed, and in a case where the headlight can realize a plurality of irradiation patterns, it is possible to realize an appropriate irradiation pattern according to the circumstances in front (in other words, traveling scenes).

Supplementary Note 2

In the headlight control system according to Supplementary Note 2, the irradiation pattern controller is configured to change an irradiation pattern of the headlight to one of a plurality of irradiation patterns during moving of the moving object. The imaging controller is configured to perform control such that the imaging unit captures the images of the circumstances in front for each of the irradiation patterns during moving of the moving object to acquire captured images.

With the headlight control system according to Supplementary Note 2, imaging (that is, collection of learning data) for each of the irradiation patterns is executed while the moving object is moving. For this reason, it is possible to accumulate captured images in a state in which the circumstances in front are different (in other words, learning data in various traveling scenes). Accordingly, it is possible to suitably learn an irradiation pattern suitable for the circumstances in front.

Supplementary Note 3

In the headlight control system according to Supplementary Note 3, the irradiation pattern controller is configured to change an irradiation pattern of the headlight to one of a plurality of irradiation patterns in a predetermined period that is short to such an extent that the circumstances in front are considered to be not changed even though the moving object is moving. The learning unit is configured to use captured images captured in the predetermined period for learning as captured images captured in a state in which the circumstances in front are the same.

With the headlight control system according to Supplementary Note 3, even though the moving object is moving, in a state where the circumstances in front are regarded to be the same, it is possible to acquire imaging results corresponding to two or more irradiation patterns. In this way, the acquired captured images are compared with each other, whereby it is possible to easily determine which irradiation pattern is suitable for the circumstances in front during imaging. Accordingly, it is possible to suitably learn an irradiation pattern suitable for the circumstances in front.

Supplementary Note 4

In the headlight control system according to Supplementary Note 4, the learning unit is configured to calculate a recognition ratio of an object in front of the moving object in the captured images, and learn an irradiation pattern having a higher recognition ratio, as the irradiation pattern that is more suitable for the circumstances in front.

With the headlight control system according to Supplementary Note 4, a recognition ratio of an object in the captured images is used, whereby it is possible to suitably learn an irradiation pattern suitable for the circumstances in front.

Supplementary Note 5

In the headlight control system according to Supplementary Note 5, the irradiation pattern controller is configured to i) select a plurality of irradiation patterns having a high possibility of being suitable for the circumstances in front based on previous learning results of the learning unit, and ii) change an irradiation pattern of the headlight to the selected irradiation patterns at the time of subsequent learning.

With the headlight control system according to Supplementary Note 5, learning is repeated, whereby the irradiation patterns that are highly likely to be suitable for the circumstances in front are gradually narrowed. For this reason, even in a case where an extremely large number of irradiation patterns are realizable by the headlight, it is possible to efficiently learn an irradiation pattern suitable for the circumstances in front.

Supplementary Note 6

In the headlight control system according to Supplementary Note 6, the irradiation pattern controller and the imaging controller are mounted in the moving object. The learning unit is mounted in a device outside the moving object.

Supplementary Note 7

In the headlight control system according to Supplementary Note 7, the circumstances in front are defined by at least one of a time slot, weather, brightness, and the presence or absence of another moving object and an obstacle.

The disclosure is not limited to the above-described embodiment, and can be changed, if desired, without departing from the spirit or scope of the disclosure that can be read from the claims and the entire specification. A headlight control system that involves such changes is also intended to be within the technical scope of the disclosure.

What is claimed is:

1. A headlight control system that controls a headlight of a moving object, the moving object including the headlight including a plurality of light sources, and a camera configured to capture images of circumstances in front of the moving object, the headlight control system comprising:
   a processor programmed to:
      generate a plurality of irradiation patterns by performing control for changing at least one of presence or absence of light emission and a degree of light emission of each of the light sources of the headlight to change an irradiation pattern of the headlight;
      perform control such that the camera captures the images of the circumstances in front for each of the irradiation patterns to acquire captured images;

calculate a recognition ratio of at least one of a pedestrian, a bicycle, a vehicle, or an obstacle in front of the moving object in each of the captured images; and learn, by using a neural network, an irradiation pattern having a higher recognition ratio for the pedestrian, the bicycle, the vehicle, or the obstacle as the irradiation pattern usable for the circumstances in front of the moving object.

2. The headlight control system according to claim 1, wherein:

the processor is programmed to change the irradiation pattern of the headlight to one of the plurality of irradiation patterns during moving of the moving object; and the processor is programmed to perform control such that the camera captures the images of the circumstances in front for each of the irradiation patterns during moving of the moving object to acquire captured images.

3. The headlight control system according to claim 1, wherein the processor is programmed to:

i) select a plurality of irradiation patterns having a possibility of being usable for the circumstances in front based on previous learning results generated by the processor, and ii) change the irradiation pattern of the headlight to the selected irradiation patterns at a time of subsequent learning.

4. The headlight control system according to claim 1, wherein the circumstances in front are defined by at least one of a time slot, weather, brightness, and presence or absence of another moving object and an obstacle.

5. A headlight control system that controls a headlight of a moving object, the moving object including the headlight including a plurality of light sources, and a camera configured to capture images of circumstances in front of the moving object, the headlight control system comprising:

a processor mounted in the moving object that is programmed to:

generate a plurality of irradiation patterns by performing control for changing at least one of presence or absence of light emission and a degree of light emission of each of the light sources of the headlight to change an irradiation pattern of the headlight; and perform control such that the camera captures the images of the circumstances in front for each of the irradiation patterns to acquire captured images;

a processor mounted in a server that is programmed to:

calculate a recognition ratio of at least one of a pedestrian, a bicycle, a vehicle, or an obstacle in front of the moving object in each of the captured images; and learn, by using a neural network, an irradiation pattern having a higher recognition ratio for the pedestrian, the bicycle, the vehicle, or the obstacle as the irradiation pattern usable for the circumstances in front of the moving object.

6. The headlight control system according to claim 1, wherein the circumstances in front are defined by a time slot, weather, brightness, and presence or absence of an object.

7. The headlight control system according to claim 1, wherein the processor is programmed to generate a ranked list by ranking, in order based on the recognition ratio associated with each captured image, each of the plurality of irradiation patterns, and the irradiation pattern learned by the neural network is selected from among the ranked list.

8. The headlight control system according to claim 5, wherein the processor mounted in the server is programmed to generate a ranked list by ranking, in order based on the recognition ratio associated with each captured image, each of the plurality of irradiation patterns, and the irradiation pattern learned by the neural network is selected from among the ranked list.

\* \* \* \* \*